Patented Sept. 3, 1929.

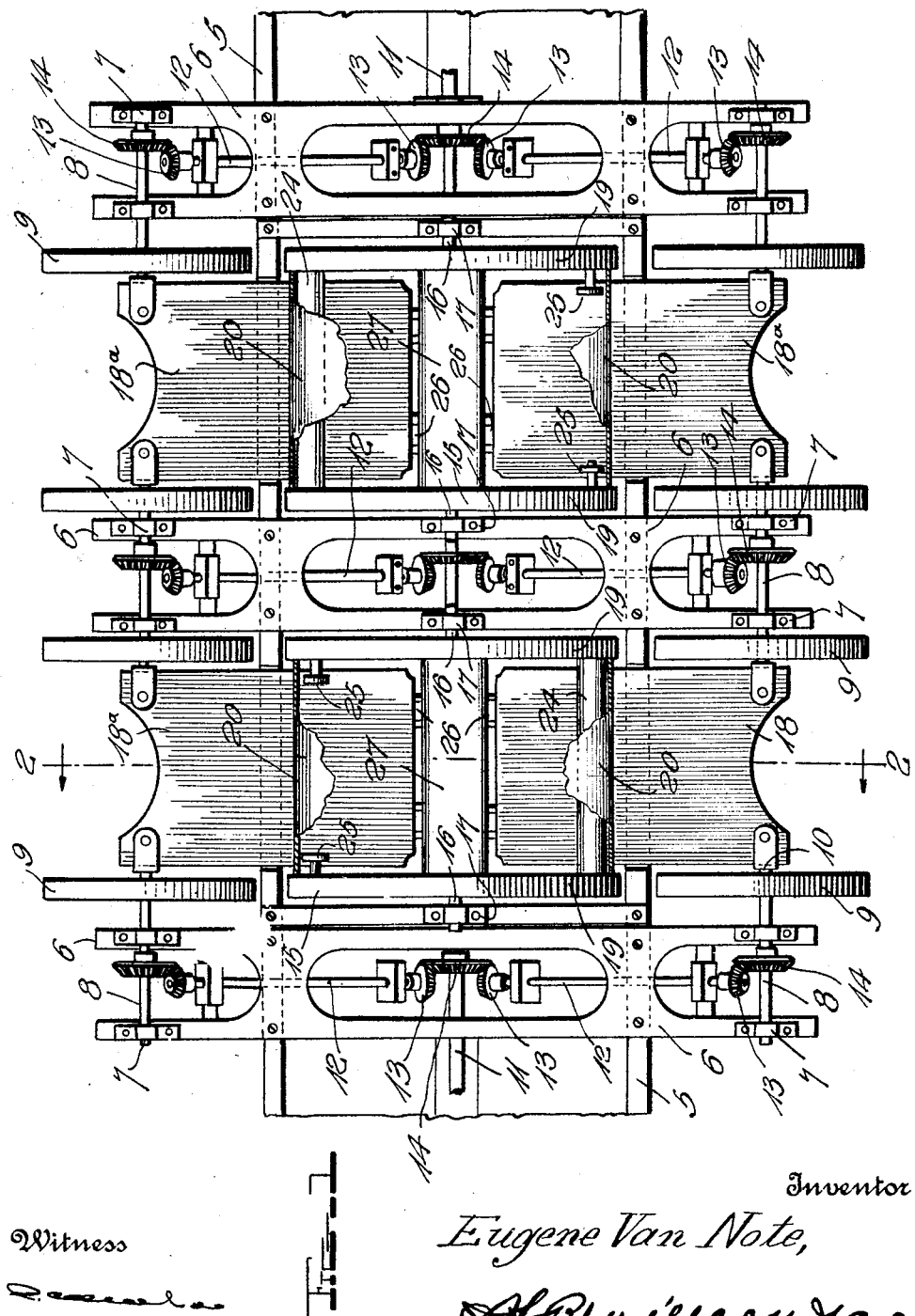

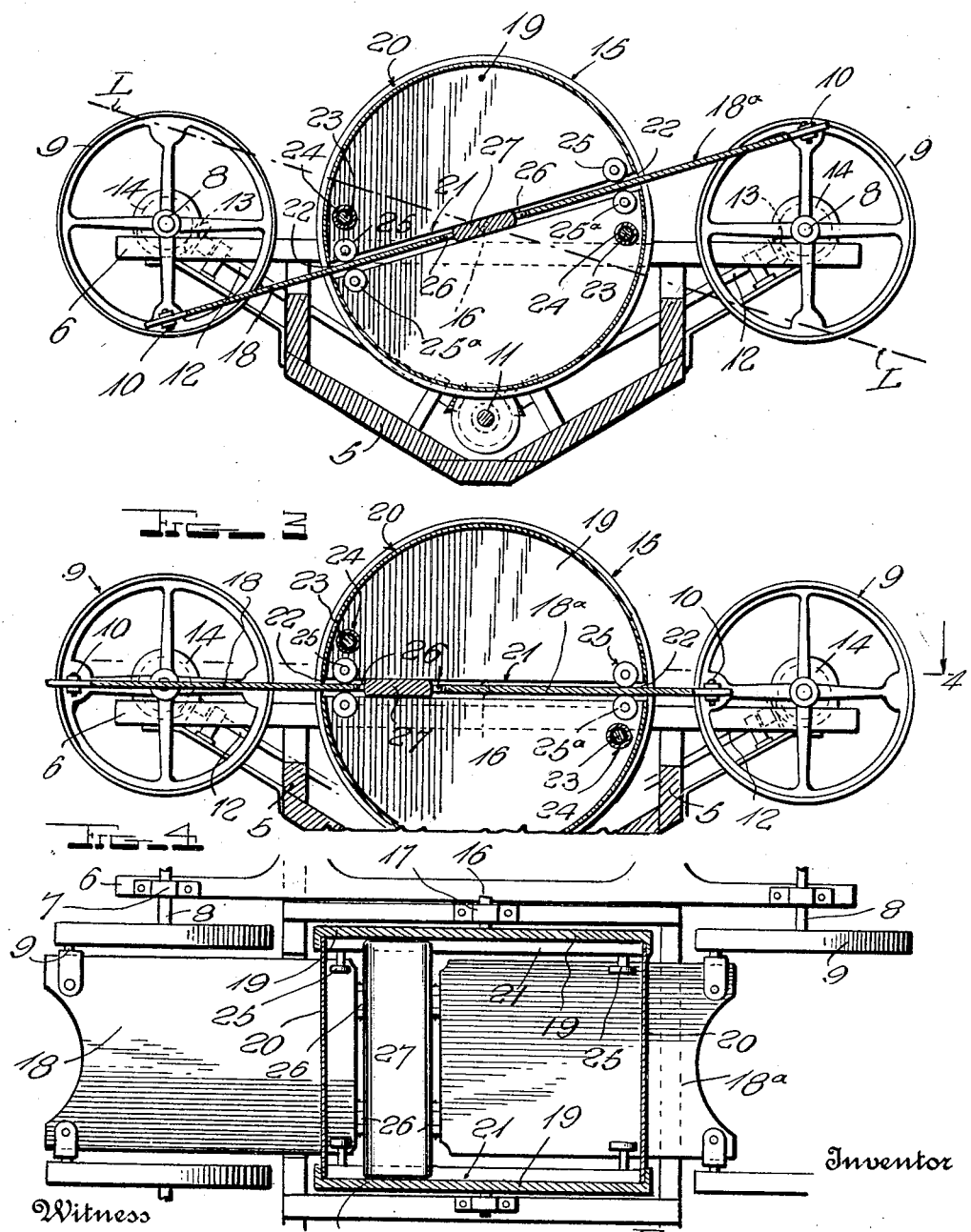

1,726,783

UNITED STATES PATENT OFFICE.

EUGENE VAN NOTE, OF NEW YORK, N. Y.

AIRCRAFT-ELEVATING MEANS.

Application filed August 24, 1928. Serial No. 301,875.

The invention relates to new and useful improvements in elevating means for various kinds of aircraft to be used in conjunction with conventional or other desired propelling and sustaining means.

It is the object of the invention to provide new and improved elevating means embodying planes which are alternately projected from and retracted into an oscillatory cradle, provision being made whereby the projected planes are forced downwardly and the retracted planes moved upwardly, thereby exerting successive downward pushes upon the air without danger of counteracting their effect by similar upward thrusts.

With the foregoing in view, the invention resides in the novel subject matter hereinafter described and claimed, description being accomplished by reference to the accompanying drawings.

Fig. 1 is a top plan view of an elevating mechanism constructed in accordance with my invention.

Fig. 2 is a vertical sectional view on line 2—2 of Fig. 1.

Fig. 3 is a view similar to Fig. 2 but showing the parts in different positions.

Fig. 4 is a horizontal sectional view on line 4—4 of Fig. 3.

The details of construction shown in the accompanying drawings will be rather specifically described with the understanding that within the scope of the invention as claimed, various changes may be made, the present disclosure being for illustrative purposes only.

5 denotes a longitudinal portion of an aircraft provided at intervals with transverse frame members 6 whose ends are preferably bifurcated and carry appropriate bearings 7 for shafts 8. These shafts are provided with wheels 9 having wrist pins 10 so that they virtually constitute cranks. A longitudinal shaft 11, upwardly diverging shafts 12 and beveled gearing 13—14, are provided for driving the shafts 8 so that the shafts at one side of the body 5 rotate in the opposite direction from those at the other side, but all of the shafts turn at uniform speed.

Between the frame members 6 are cradles 15 mounted for oscillation on appropriate bearing stubs 16 and bearings 17, the latter being secured to said frame members. Associated with each cradle 15 are two planes 18—18ª whose outer ends are connected to the wrist pins 10. The construction of all of the cradles 15 is identical and the manner of mounting the planes 18—18ª on all of them is the same. Consequently, only the construction associated with one cradle has been shown in detail and the descriptive matter will be similarly restricted.

Drum 15 embodies two end members 19 and a cylindrical side wall 20 secured to them, the inner sides of said end members being formed with diametrically extending grooves 21 and the wall 20 being provided with slots 22 at the ends of said grooves. The end members 19 are tied together and relatively stiffened by appropriate bolts or the like 23 which may be surrounded by spacing sleeves 24. At the outer ends of the grooves 21, the members 19 are provided with upper and lower rollers 25—25ª. These rollers, the slots 22 and the grooves 21 constitute radial guideways for the planes 18—18ª. These planes pass through the slots 22 between the rollers 25—25ª and as shown have their inner ends connected at 26 with a slide 27 whose ends are received in the grooves 21. The outer ends of the planes are connected with the wrist pins 10 as above mentioned, and the relation of these wrist pins is such that when those at one side of the cradle 15 are at extreme lowered position, those at the opposite side are at extreme raised position, as shown in Fig. 2. Then too, when the wrist pins at one side of the cradle are at their extreme inward position, those at the opposite side are at their extreme outward position, as will be clear from Fig. 3. Moreover, it may be explained that when the planes 18—18ª of one unit of the elevating means, stand as shown in Fig. 2, the planes of the next adjacent unit stand at a plane indicated by the dot and dash line L of said figure, and when a plane for instance at the right hand side of one cradle is being projected, the plane at the left hand side of the next adjacent cradle is being similarly projected, so that the thrusts which the planes exert upon the air are well counterbalanced and vibration is reduced to the minimum.

As the wheels 9 are driven, each plane is alternately moved into and projected from the cradle 15 and as soon as projection of the plane starts, said plane starts also to descend, so that it creates a downward push upon the air. As soon as any plane starts to retract into the cradle 15, it starts also to move upwardly and when the cranks or wrist pins would otherwise cause the plane to exert a forcible upward thrust upon the air, said plane is almost totally confined within the cradle so that no such thrust can be created to counteract the effect of the downward thrust of another plane. During the projection and retraction of the planes and the upward and downward movements thereof, the pivots of the cradle 15 constitute pivots about which said planes swing, said cradle being free to oscillate and being moved only under the influence of the planes.

Attention is again invited to the fact that within the scope of the invention as claimed, numerous variations may be made.

I claim:—

1. An aircraft elevating means comprising a support, a cradle mounted for oscillation thereon upon a substantially horizontal axis, said cradle having an internal substantially radial guideway, a plane slidably mounted in said guideway for retraction into the cradle and projection therefrom, and means for so retracting and projecting said plane, for downwardly moving said plane when projected and for upwardly moving said plane when retracted, the axis of said cradle constituting a pivot about which the plane swings when moved upwardly and downwardly.

2. An aircraft elevating means comprising a support, a cradle mounted for oscillation thereon upon a substantially horizontal axis, said cradle having an internal substantially radial guideway, a plane slidably mounted in said guideway for retraction into the cradle and projection therefrom, and a driven crank mounted on the support on an axis parallel with the cradle axis, said crank being connected with the outer end of said plane for retracting and upwardly moving the latter and for projecting and downwardly moving the same, the axis of the cradle constituting a pivot about which the plane swings when moved upwardly and downwardly.

3. A structure as specified in claim 1; together with a duplicate plane and guideway therefor mounting it slidably in the cradle opposite the first named plane, and means for sliding and moving said duplicate plane upwardly and downwardly to cause operation thereof in the same manner as the first named plane.

4. An aircraft elevating means comprising a support, a cradle mounted for oscillation thereon upon a substantially horizontal axis, said cradle having an internal substantially radial guideway, a plane slidably mounted in said guideway for retraction into the cradle and projection therefrom, a duplicate plane and guideway therefor mounting it in said cradle opposite the first named plane, cranks mounted on the support on axes parallel with the cradle axis, and means for driving said cranks at uniform speed in opposite directions, causing simultaneous projection of one plane and retraction of the other plane, downward movement of the projected plane and upward movement of the retracted plane, the axis of said cradle constituting a cradle about which the planes swing when moved upwardly and downwardly.

In testimony whereof I have hereunto affixed my signature.

EUGENE VAN NOTE.